(12) United States Patent
Plagge et al.

(10) Patent No.: US 9,039,531 B2
(45) Date of Patent: May 26, 2015

(54) RUMBLE MOTOR MOVEMENT DETECTION

(71) Applicant: Microsoft Corporation, Redmond, WA (US)

(72) Inventors: Mark Plagge, Sammamish, WA (US); Andrew Jesse Milluzzi, Westlake, OH (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 126 days.

(21) Appl. No.: 13/759,877

(22) Filed: Feb. 5, 2013

(65) Prior Publication Data

US 2014/0221097 A1 Aug. 7, 2014

(51) Int. Cl.
| A63F 9/24 | (2006.01) |
|---|---|
| A63F 13/20 | (2014.01) |
| G06F 1/32 | (2006.01) |
| A63F 13/285 | (2014.01) |
| H02P 7/00 | (2006.01) |

(52) U.S. Cl.
CPC .............. *A63F 13/06* (2013.01); *G06F 1/3206* (2013.01); *G06F 1/3259* (2013.01); *H02P 2007/0088* (2013.01); *H02P 2007/0077* (2013.01); *A63F 13/285* (2014.09); *Y02B 60/1253* (2013.01); *Y02B 60/32* (2013.01)

(58) Field of Classification Search
CPC ............ H02P 6/182; H02P 2007/0088; H02P 2007/0077; A63F 13/02; A63F 13/06; A63F 13/08; A63F 13/285; Y02B 60/32; Y02B 60/1253; G06F 1/3206; G06F 1/3259
USPC .......................................................... 463/36
See application file for complete search history.

(56) References Cited

U.S. PATENT DOCUMENTS

| 5,724,068 | A | 3/1998 | Sanchez et al. |
|---|---|---|---|
| 5,742,278 | A | 4/1998 | Chen et al. |
| 6,404,157 | B1 * | 6/2002 | Simon .......................... 318/445 |
| 6,429,849 | B1 | 8/2002 | An et al. |
| 6,563,487 | B2 | 5/2003 | Martin et al. |
| 7,774,155 | B2 | 8/2010 | Sato et al. |
| 7,890,863 | B2 | 2/2011 | Grant et al. |
| 8,297,682 | B2 * | 10/2012 | Oirsouw et al. ........... 296/146.4 |
| 2007/0079155 | A1 | 4/2007 | Liao et al. |
| 2008/0300055 | A1 | 12/2008 | Lutnick et al. |
| 2009/0048009 | A1 | 2/2009 | Brekelmans et al. |
| 2009/0121865 | A1 | 5/2009 | Hamel et al. |
| 2011/0203181 | A1 * | 8/2011 | Magner et al. .................. 49/324 |
| 2012/0113491 | A1 * | 5/2012 | Hezemans et al. ......... 359/198.1 |
| 2013/0194084 | A1 * | 8/2013 | Lacroix et al. ............. 340/407.1 |

FOREIGN PATENT DOCUMENTS

WO   2008057227 A2   5/2008

OTHER PUBLICATIONS

"Logitech gamepads. Broad game support. Because you just want it to work.", Retrieved at <<http://www.logitech.com/en-us/265/7442>>, Retrieved Date: Oct. 22, 2012, pp. 2.
ISA European Patent Office, International Search Report and Written Opinion Issued in PCT Patent Application No. PCT/US2014/014520, Feb. 24, 2015, WIPO, 11 Pages.

* cited by examiner

*Primary Examiner* — Dmitry Suhol
*Assistant Examiner* — Carl V Larsen
(74) *Attorney, Agent, or Firm* — Aaron Chatterjee; Kate Drakos; Micky Minhas

(57) ABSTRACT

A control device comprises an electric motor and a controller. The controller may be configured to receive a signal from the electric motor and selectively change a state of the control device responsive to the signal.

19 Claims, 5 Drawing Sheets

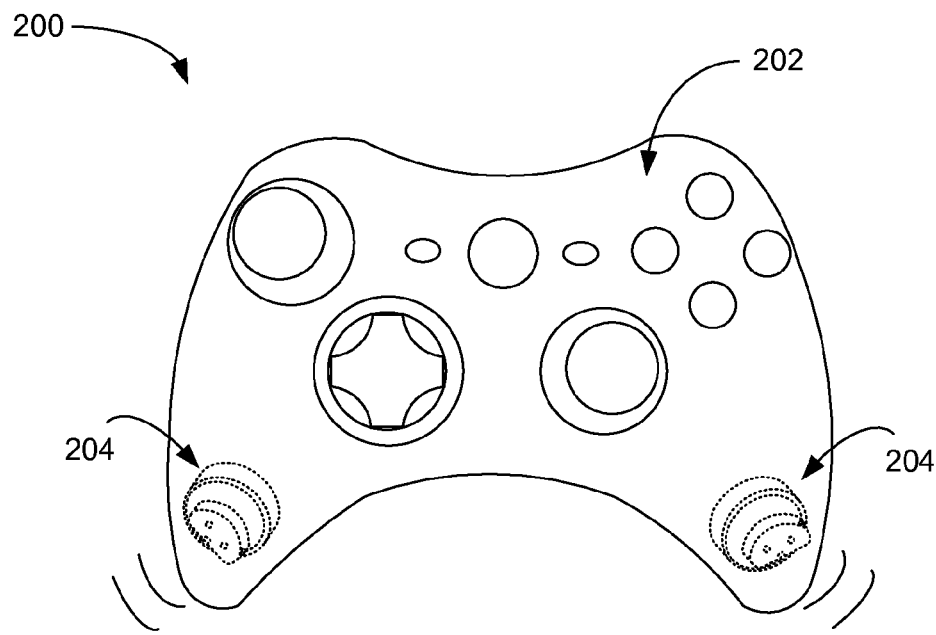
FIG. 2
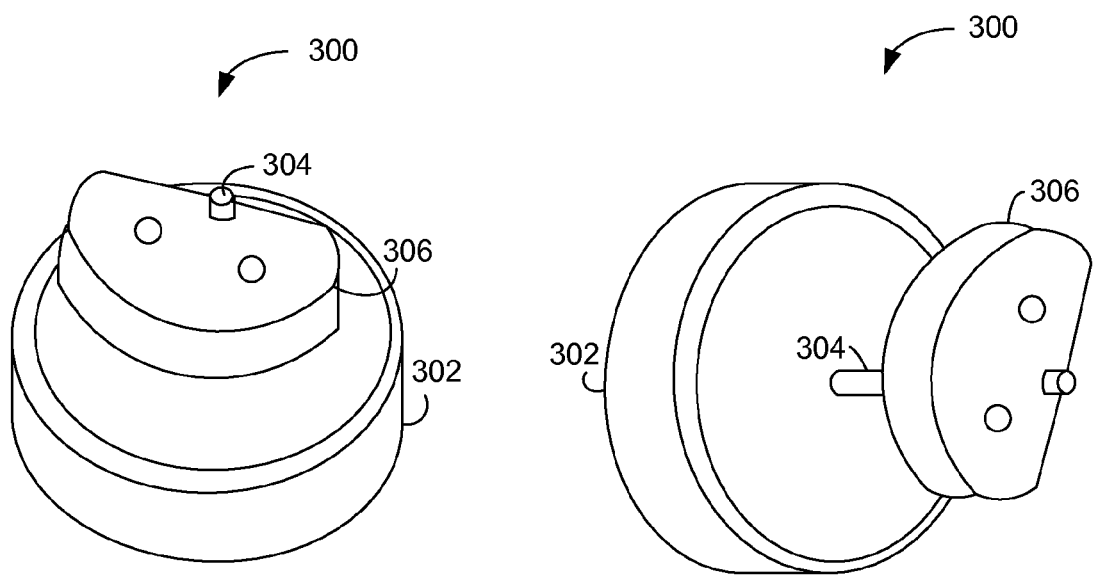
FIG. 3A
FIG. 3B

RUMBLE MOTOR MOVEMENT DETECTION

BACKGROUND

Some control devices include a rumble motor for providing haptic feedback relating to an event, such as an event relating to an application, feature, and/or device being controlled by the control devices. Further, some control devices operate in one or more states in order to provide functions during active use of the control devices and save power during inactivity of the control devices. Detecting activity and subsequently changing states is often performed in response to manual input provided by a user, such as depressing a button for a length of time. A user may then wait for the manual input to be registered and the control device to change states before the user is able to utilize the control device.

SUMMARY

Embodiments are disclosed herein for providing a control device that selectively changes states responsive to an input generated at a motor of the control device. For example, a control device may comprise an electric motor and a controller. The controller may be configured to receive an input from the electric motor and selectively change a state of the control device responsive to the input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows an example of a control device in accordance with an embodiment of the present disclosure.

FIGS. 3A and 3B show perspective views of an example of a motor of a control device in accordance with an embodiment of the present disclosure.

DETAILED DESCRIPTION

The present disclosure is directed to intelligently switching states of a control device, such as a game controller, between a low-power state and a normal power state responsive to movement of a rumble motor of the control device. When a user picks up or otherwise moves a control device to begin interacting with the control device, an unbalanced weight of the rumble motor of the control device shifts, generating a voltage at electrical terminals of the rumble motor. By measuring this output voltage at the electrical terminals of the rumble motor, the control device may determine that the user has picked up the control device and switch from a low-power state to a normal state without any further interaction from the user. Accordingly, the control device may automatically detect movement without the added cost and complexity associated with including accelerometers, light sensors, or other similar elements within the control device. Further, some motion detection elements, such as light sensors, may become damaged or blocked over time and thereby perform less reliably than the rumble motor detection methods and devices described herein.

Figure 1:
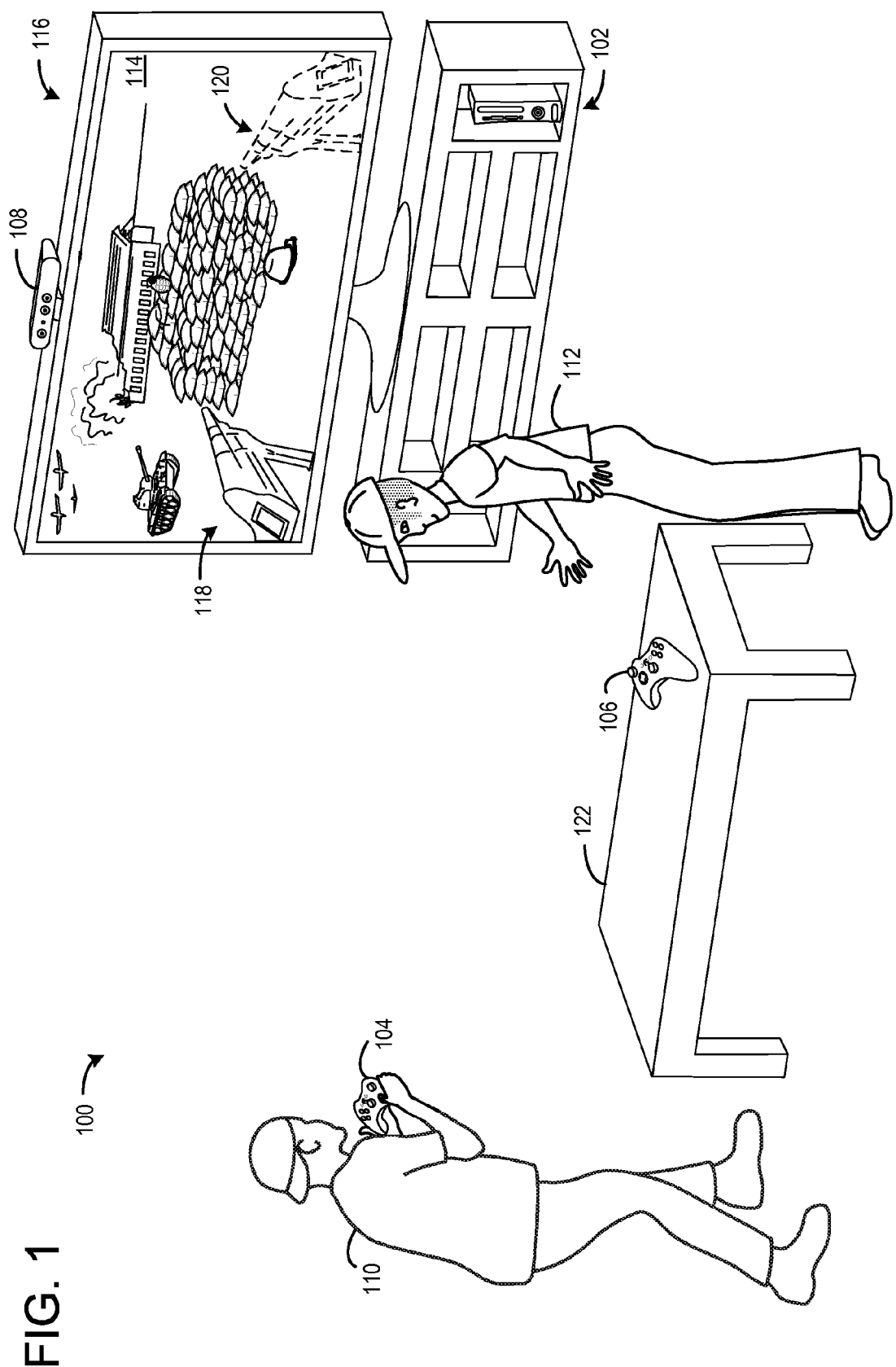
FIG. 1 schematically shows a non-limiting example of an environment including a computing system and one or more control devices in accordance with an embodiment of the present disclosure.

FIG. 1 shows an example environment 100 including computing system 102 and control devices 104 and 106. Although environment 100 is illustrated as a room, environment 100 may be any suitable physical space, including indoor and/or outdoor environments. Computing system 102 may be configured to receive input from and/or communicate with control devices 104 and 106. Control devices in accordance with the present disclosure may include any suitable control device, including but not limited to game controllers, audio headphones and/or headsets, remote controls, musical instruments (e.g., guitar, drums, etc.), steering wheel controllers, flightsticks, weapons (e.g., sword, laser sword, pistol, rifle, saber, halberd, nunchaku, etc.), tablets, mobile phones, mobile computing devices, etc. In the illustrated embodiment, control devices 104 and 106 take the form of game controllers. Computing system 102 may include an imaging device, such as depth camera 108. For example, depth camera 108 may include one or more sensors, lens elements, and/or light sources that are configured to image environment 100. Depth camera 108 may utilize any suitable depth imaging technology, including but not limited to a time-of-flight depth camera and/or a structured light depth camera. Depth camera 108 may include additional sensors, including but not limited to a visible light camera and/or one or more microphones. Depth camera 108 may generate and send depth images to computing system 102. The depth images may indicate a depth of a surface imaged by each pixel of the depth images in order to provide information regarding one or more features of environment 100.

As further illustrated in FIG. 1, environment 100 may include one or users, such as game player 110 and game player 112. In some embodiments, one or more of the users, such as game player 110, may interact with computing system 102. For example, computing system 102 may provide visual output to game player 110 in any suitable manner, such as through display 114 of display device 116. Game player 110 may provide input to computing system 102 via one or more user input devices, such as control device 104, depth camera 108, a microphone, and/or any other suitable user input device. User input devices, such as those described above, may communicate with computing system 102 in any suitable manner, including but not limited to wired and/or wireless configurations.

Accordingly, in multi-user environments, a first user, such as game player 110 may provide input via control device 104 while a second user, such as game player 112 provides input via control device 106. By associating each control device with a respective user, computing system 102 may provide a multiplayer gaming experience. For example, user input provided by control device 104 may be applied to a first player representation 118 and user input provided by control device 106 may be applied to a second player representation 120. However, as illustrated in FIG. 1, a control device, such as control device 106, may be inactive for a period of time. Upon determination that the control device has been inactive for a period of time, the control device may change states from a normal state to a low-power state.

Determination of inactivity may be performed in any suitable manner by the control device, the computing system 102, and/or any other suitable device. For example, game player 112 may place the control device on an object, such as table 122, and provide no input to the control device. The control device may determine that there has been no movement and/or input associated with the device for a period of time that is greater than an inactivity threshold, and in response, the control device may automatically switch to a low-power state. The inactivity threshold may be any suitable range of time. The inactivity threshold may be predetermined and/or may be changed dynamically based on one or more parameters, such as operating conditions of the control device and/or a computing system. In some embodiments, the control device may be instructed to enter a low-power state based on one or more signals received from an external source, such as computing system 102. The signals may be received in response to determination of inactivity associated with the control device and/or in response to a change in state of the computing system 102. For example, the control device may enter a low-power state responsive to the computing system 102 operating under a particular operating condition.

A low-power state of a control device may also be referred to as an inactive and/or sleep state and/or mode of operation. The low-power state may differ from a normal state in any suitable manner. In some embodiments, a low-power state may consume less power than a normal state by turning off and/or transitioning one or more modules of the control device to a sleep mode upon entering a low-power state. During a low-power state, the control device may not respond to one or more user inputs. Further, the control device may not be configured to send and/or receive signals during a low-power state. In some embodiments, all or some functionality of the control device may be inhibited during a low-power state. Conversely, all or some functionality of the control device may be active during a normal state.

A control device may have multiple low power states, each low power state having one or more features discussed above. One or more of the low power states may respond to the same input in different or similar ways. For example, some low power states may include different reaction times to received signals or perform different functions from other low power states.

The control device may be configured to remain in a low-power state until an interrupt is generated. In some embodiments, such an interrupt may be tied to analog circuitry within the control device. Turning now to FIG. 2, an example game controller 200 is illustrated. Game controller 200 may be one example of control devices 104 and/or 106 of FIG. 1. Further, one or more elements illustrated in FIG. 2 as corresponding to game controller 200 are not limited to game controllers and may be present in any suitable control device. Game controller 200 may include one or more user input elements 202. For example, user input elements 202 may include any suitable elements for accepting user input, including but not limited to depressible buttons, joysticks, triggers, directional pads, touch screens, motion sensors, gesture detection devices, etc. Game controller 200 also includes a haptic feedback mechanism, such as a rumble feature. The haptic feedback mechanism may provide a physical and/or tactile sensation that is detectable by a user that is touching and/or holding the game controller. The feedback may indicate any suitable information to a user of the game controller, such as a state and/or or event associated with an application and/or computing system. For example, when playing a racing game, the haptic feedback may indicate that a vehicle being controlled by the user via the game controller has come into contact with an object within the game, such as a wall, rough terrain, another vehicle, etc.

As illustrated in FIG. 2, the haptic feedback may be provided by one or more rumble motors 204. Operating one or more rumble motors causes the game controller to vibrate and/or otherwise provide a tactile response to a user of the game controller. Although two rumble motors 204 are illustrated in FIG. 2, any suitable number and/or arrangement of rumble motors may be included in a control device, such as game controller 200.

FIGS. 3A and 3B show two perspective views of a rumble motor 300. For example, rumble motor 300 may correspond to rumble motors 204 of FIG. 2. Rumble motor 300 may comprise any suitable electric motor. For example, rumble motor 300 may comprise a brushed DC electric motor having a housing 302 and a shaft 304 attached thereto. The housing 302 may include an armature mounted to the shaft 304, such that energizing coil windings of the armature by applying current to leads of the rumble motor 300 causes the shaft to rotate. The rumble motor 300 may further include an unbalanced weight 306 mounted to or otherwise positioned on the shaft 304. The unbalanced weight 306 may have any suitable structure and/or position on the shaft 304 that provides an uneven distribution of weight with respect to a path of rotation of the weight around the shaft. For example, as illustrated in FIGS. 3A and 3B, the unbalanced weight 306 may have a substantially semi-circular shape. The unbalanced weight causes the rumble motor 300 to vibrate when it is rotated with the shaft, thereby enabling the haptic feedback described above.

However, the unbalanced weight 306 may provide another feature that may be used to effect a change in activity state of a control device that includes the rumble motor 300. During inactivity, the rumble motor may be substantially stationary, and the unbalanced weight may be at a rest position. However, any movement applied to a control device that includes the rumble motor, such as picking up the control device from a resting place, causes the unbalanced weight to shift positions, thereby rotating the shaft. Such external rotation of the shaft produces an electromotive force (EMF), or voltage, across the leads of the rumble motor. By detecting the voltage, the control device may determine that a user may provide input; therefore, the control device may switch from a low-power state to a normal state of operation.

Figure 4:
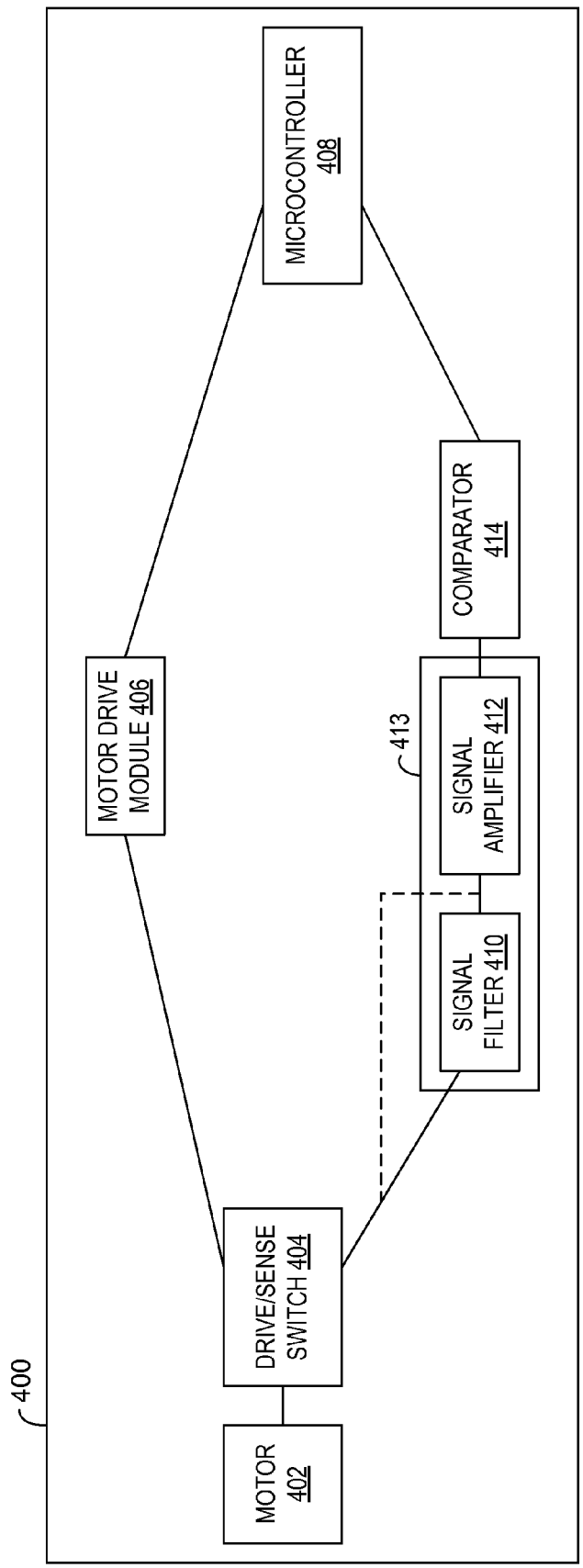
FIG. 4 shows an example block diagram of a control device in accordance with an embodiment of the present disclosure.

FIG. 4 illustrates a block diagram of elements within a control device 400 that enable intelligent state switching in the control device. For example, control device 400 may correspond to control devices 104 and/or 106 of FIG. 1. Control device 400 may include a motor 402, which is communicatively and/or operatively connected to a drive/sense switch 404. The drive/sense switch may be hardware- or software-controlled responsive to a state of the control device 400. For example, during a normal state, the drive/sense switch 404 may enable a connection between the motor 402 and a motor drive module 406. The motor drive module 406 may be controlled by a microcontroller 408 or other suitable controller to selectively drive the motor 402. For example, the microcontroller 408 may receive an instruction to provide haptic feedback from an external device, such as computing system 102 of FIG. 1. In response, the microcontroller 408 may send an output signal to motor drive module 406 to drive motor 402. Driving motor 402 causes an unbalanced weight of the motor 402 to spin on a shaft, thereby vibrating the motor 402 and the control device 400 to provide haptic feedback to a user of the control device 400.

During a low-power state, the control device 400 may disable the motor drive module 406 and/or otherwise provide a lower level of feedback functionality than a normal state. Accordingly, the drive/sense switch 404 may be hardware- or software-controlled to communicatively and/or operatively connect the motor 402 to a signal filter 410. The drive/sense switch 404 may thereby be configured to selectively connect the motor to the motor drive module 406 and the signal filter 410. For example, the drive/sense switch 404 may be configured to only connect the motor 402 to the filter and subsequent elements of the control device 400 during a low-power state so that the elements are not damaged by operation of the motor 402 during the normal state. Likewise, the drive/sense switch 404 may be configured to only connect the motor 402 to the motor drive module 406 during a normal state, to ensure that the motor 402 may not be driven during a low-power state.

The signal filter 410 may filter out noise from electrical terminals and/or leads of the motor 402 in order to prevent the control device from switching states improperly. The signal filter 410 may be any suitable noise reduction filter, including but not limited to a low pass filter. In some embodiments, the signal filter 410 may comprise a hardware filter. In additional or alternative embodiments, filtering by the signal filter 410 may be performed by executing instructions with a logic device. The output from the motor 402 during the low-power state, in which the motor 402 may not be actively driven (e.g., by the motor drive module 406), may be passed from the signal filter 410 to a signal amplifier 412 and a comparator 414 in order to determine whether the output voltage exceeds a threshold voltage. Accordingly, the signal filter 410 may be configured to receive and filter signals from the motor 402 and the amplifier 412 may be configured to receive and amplify the filtered signals from the signal filter 410.

The signal filter 410 and the signal amplifier 412 may collectively provide a filtering and amplification system 413. Elements of the filtering and amplification system 413 may comprise hardware elements and/or instructions executable by a logic device to perform the filtering and/or amplification. Further, the comparator 414 may be configured to receive and compare signals from the amplifier 412 to the threshold voltage. The threshold voltage may be any suitable voltage corresponding to a voltage generated responsive to a control device being picked up by a user.

For example, the comparator 414 may receive an input voltage from the motor 402 that is filtered by a filter element such as the signal filter 410 and amplified by the signal amplifier 412. The comparator 414 may then compare the input voltage to a threshold voltage to determine whether the input voltage from the motor 402 exceeds the threshold voltage. The comparator 414 may be communicatively and/or operatively connected to the microcontroller 408 such that a signal indicating a result of the comparison is provided to the microcontroller 408 in order to generate a digital interrupt when the input voltage from the motor 402 exceeds the threshold voltage. Upon detecting the interrupt, the microcontroller 408 may change the state of the control device from a low-power state to a normal state, which may include changing the drive/sense switch 404 to enable a connection between the motor 402 and the motor drive module 406. Accordingly, the microcontroller 408 may receive an input signal from the comparator 414 to selectively change the state of the control device responsive to the input signal during a low-power state.

In some embodiments, changes in state of the control device may be performed with an analog configuration. For example, as illustrated by the dashed line in FIG. 4, a signal from the motor 402 that passes through the drive/sense switch 404 may bypass the signal filter 410. The unfiltered signal may be amplified by the signal amplifier 412 and passed to the comparator 414, which may comprise a digital signal processing (DSP) module. The DSP module may process the unfiltered and amplified signal in order to determine whether an interrupt should be generated at the microcontroller 408. In some embodiments, the DSP module may analyze the unfiltered amplified signal for a particular wave pattern and send a signal to the microcontroller 408 responsive to such analysis. For example, the DSP module may receive information representing a wave pattern of an output voltage of the motor 402 while the motor 402 is not being actively driven and compare the wave pattern to a predetermined wave pattern. Accordingly, the input signal received by the microcontroller 408 may be a signal indicating a result of comparing the wave pattern to the predetermined wave pattern.

Figure 5:
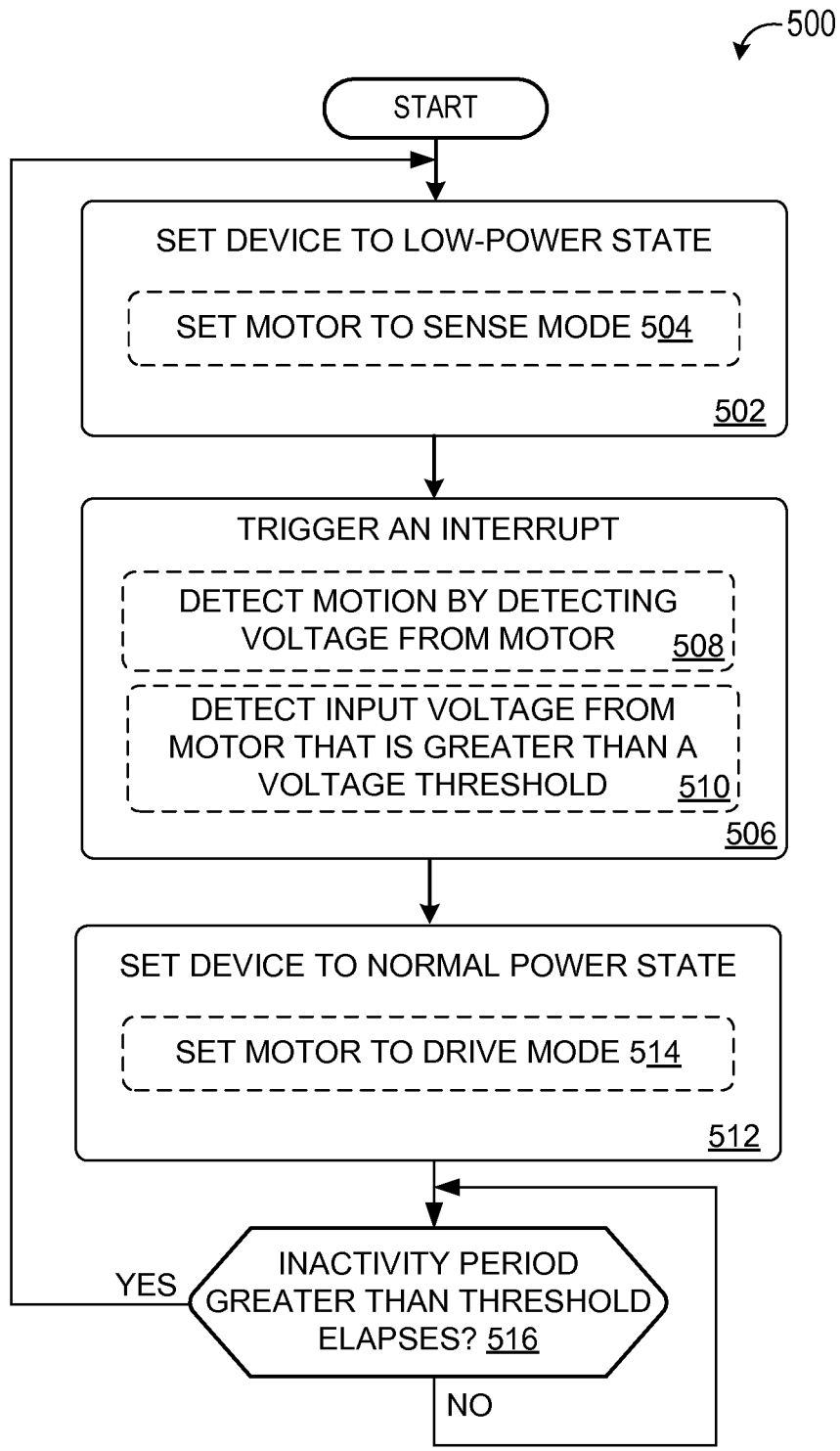
FIG. 5 shows an example method of changing states in a control device in accordance with an embodiment of the present disclosure.

FIG. 5 illustrates an example of a method 500 of switching between a low-power state and a normal power state. At 502, a device may be set to a low-power state. For example, the device may correspond to the control device 400 of FIG. 4. The motor and switching element of the device may be switched to a sense mode at 504 responsive to and/or as a part of the process of setting the device to the low-power state. For example, during the sense mode, the control device may be configured to detect movement of the controller based on a voltage generated at electrical terminals of the motor. Further, while in the sense mode, the motor of the device may be communicatively and/or operatively connected to a low pass filter, a signal amplifier, and/or a comparator. While the device is set in a low-power state, an interrupt may be triggered at a microcontroller, as indicated at 506. For example, as indicated at 508, the interrupt may be triggered at a microcontroller, such as microcontroller 408 of FIG. 4, in response to detecting motion of the device by detecting voltage from electrical terminals of a motor, such as motor 402 of FIG. 4. Method 500 may further include triggering an interrupt responsive to detecting input voltage from the motor that is greater than a voltage threshold, as indicated at 510.

In response to the interrupt triggered at 506, the method 500 includes setting the device to a normal power state at 512. Optionally, the motor and switching element may be switched to a drove mode at 514. For example, the drive mode may allow the motor to be driven in order to generate vibratory feedback to a user of the control device. Further, while in the drive mode, the motor of the device may be communicatively and/or operatively connected to a motor driver module. As indicated at 516, the device may determine whether an inactivity period greater than a threshold elapses. If such an inactivity period has elapsed, the method may return to 502, in which the control device is set to a low-power state. For example, if a user puts down the control device and/or does not provide input for an inactivity threshold period of time, the control device may be set to a low-power state to conserve power. Conversely, if such an inactivity period has not elapsed, the device may maintain the normal power state and continue to determine whether an inactivity period greater than a threshold elapses.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
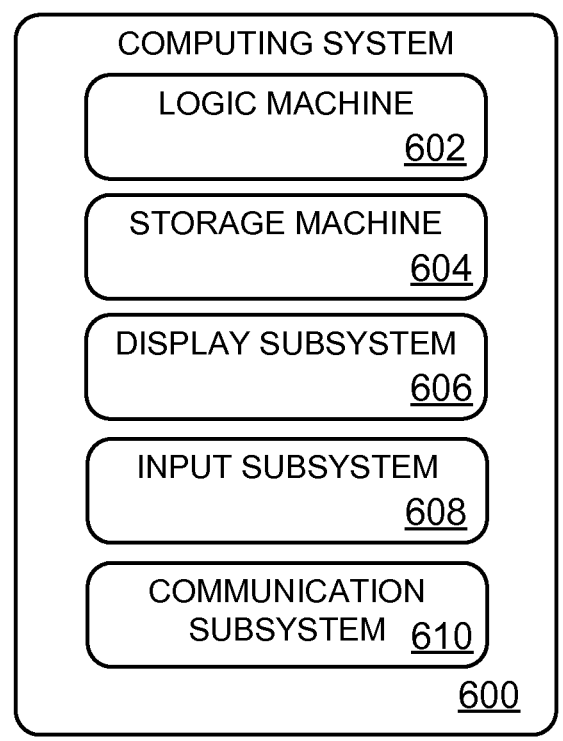
FIG. 6 is an example computing system in accordance with an embodiment of the present disclosure.

FIG. 6 schematically shows a non-limiting embodiment of a computing system 600 that can enact one or more of the methods and processes described above. Computing system 600 is shown in simplified form. Computing system 600 may take the form of one or more control devices, gaming consoles, personal computers, server computers, tablet computers, home-entertainment computers, network computing devices, mobile computing devices, mobile communication devices (e.g., smart phone), and/or other computing devices. For example, computing system 600 may include control devices 104 and 106 and/or computing system 102 of FIG. 1.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold and/or store machine-readable instructions executable by the logic machine to implement the methods and processes described herein. For example, logic machine 602 may be in operative communication with a rumble motor, such as motor 402 of FIG. 4, and storage machine 604. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include machine-readable volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices. For example, display subsystem 606 may include display device 116 of FIG. 1.

When included, input subsystem 608 may comprise or interface with one or more user-input devices such as a keyboard, mouse, touch screen, microphone, or game controller. For example, input subsystem may include or interface with control devices 104 and/or 106 of FIG. 1. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A control device comprising:
an electric motor;
an unbalanced weight positioned on a shaft of the electric motor; and
a controller configured to:
receive a signal from the electric motor, the signal being generated at electrical terminals of the electric motor during movement of the unbalanced weight on the shaft while the control device is in a low-power state in which the electric motor is not actively driven; and
selectively change a state of the control device responsive to the signal.

2. The control device of claim 1, further comprising:
a filter element operatively connected to the electric motor; and
a signal amplifier operatively connected to the filter element, wherein the signal from the electric motor is a voltage output of the electric motor while the control device is in a low-power state in which the electric motor is not actively driven, the filter element filters the voltage output, and the signal amplifier amplifies the filtered voltage output.

3. The control device of claim 1, wherein selectively changing a state of the control device further comprises selectively changing from a low-power state to a normal state responsive to the signal.

4. The control device of claim 2, further comprising a comparator configured to:
receive an input voltage from the electric motor while the electric motor is not being actively driven, the input voltage being filtered by the filter element and amplified by the signal amplifier; and
compare the input voltage to a threshold voltage, wherein the signal received by the controller is a signal indicating a result of comparing the input voltage to the threshold voltage.

5. The control device of claim 1, further comprising a comparator configured to:
receive information representing a wave pattern of an output voltage of the electric motor while the electric motor is not being actively driven; and
compare the wave pattern to a predetermined wave pattern, wherein the signal received by the controller is a signal indicating a result of comparing the wave pattern to the predetermined wave pattern.

6. The control device of claim 2, further comprising a switch configured to selectively connect the electric motor to the filter element and the signal amplifier only during a low-power state of the control device.

7. The control device of claim 2, wherein the filter element is a noise reduction filter.

8. The control device of claim 1, wherein the electric motor is a brushed DC motor.

9. The control device of claim 1, wherein the control device is a game controller.

10. In a controller of a control device, a method of changing a state of the control device, the method comprising:
while the control device is set in a low-power state, triggering an interrupt responsive to detecting from a motor of the control device a voltage that is greater than a threshold voltage, the voltage being generated during movement of an unbalanced weight on a shaft of the motor; and
setting the control device to a normal state responsive to the interrupt.

11. The method of claim 10, further comprising setting the control device to the low-power state responsive to determining that a period of inactivity of the control device exceeds an inactivity threshold.

12. The method of claim 11, further comprising setting the motor to a sense mode in which the motor is communicatively connected to a filtering and amplification system.

13. The method of claim 10, wherein setting the control device to a normal state further comprises setting the motor to a drive mode in which the motor is communicatively connected to a motor drive module.

14. A game controller, comprising:
a rumble motor;
a drive module configured to drive the rumble motor;
a signal filter configured to receive input from the rumble motor;
an amplifier configured to receive input from the signal filter;
a comparator configured to receive input from the amplifier; and
a controller configured to:
selectively connect the rumble motor to the drive module and the signal filter via a switching element responsive to a state of the game controller;
send an output signal to the drive module to drive the motor during a normal state; and
receive an input signal from the comparator to selectively change the state of the control device responsive to the input signal during a low-power state.

15. The game controller of claim 14, further comprising an unbalanced weight positioned on a shaft of the rumble motor, wherein a voltage is generated at electrical terminals of the rumble motor during movement of the unbalanced weight on the shaft while the control device is in a low-power state in which the rumble motor is not actively driven.

16. The game controller of claim 14, wherein selectively changing the state of the game controller further comprises selectively changing from the low-power state to the normal state responsive to the input signal.

17. The game controller of claim 14, wherein the comparator is configured to:
receive an input voltage from the rumble motor while the rumble motor is not actively driven, the input voltage being filtered by the signal filter and amplified by the amplifier; and
compare the input voltage to a threshold voltage, wherein the input signal received by the controller is a signal indicating a result of comparing the input voltage to the threshold voltage.

18. The game controller of claim 14, wherein the comparator is configured to:
receive information representing a wave pattern of an output voltage of the rumble motor while the rumble motor is not being actively driven; and
compare the wave pattern to a predetermined wave pattern, wherein the input signal received by the controller is a signal indicating a result of comparing the wave pattern to the predetermined wave pattern.

19. The game controller of claim 14, wherein the rumble motor is only connected to the drive module via the switching element during the normal state and the rumble motor is only connected to the signal filter via the switching element during the low-power state.

* * * * *